Figure 1:
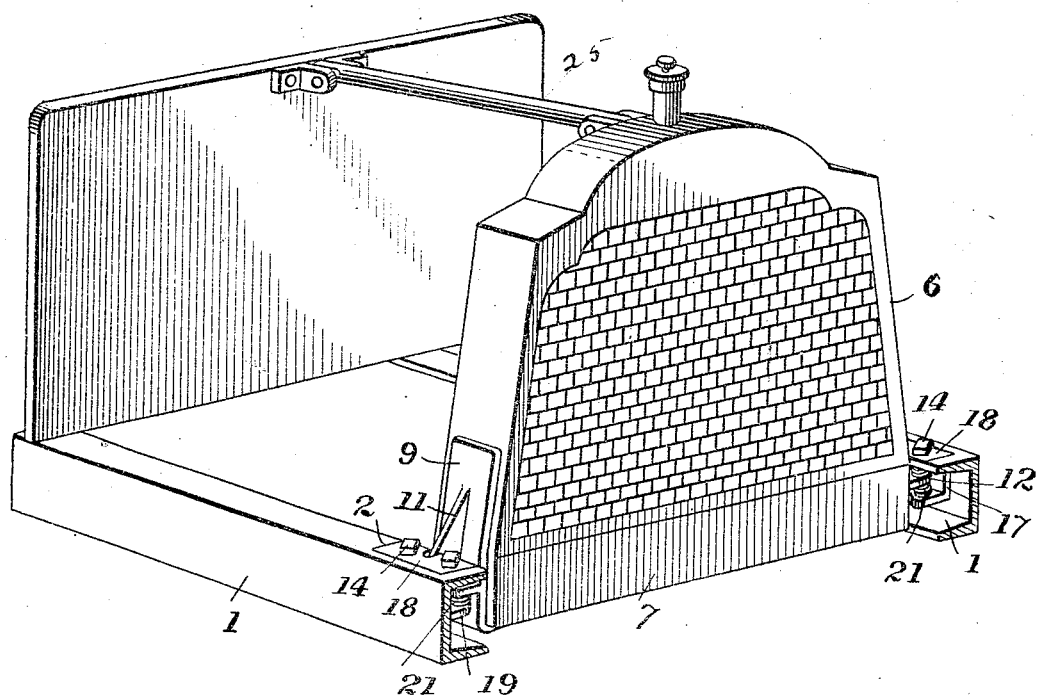

V. LINK.
MOTOR VEHICLE.
APPLICATION FILED DEC. 7, 1909.

1,083,330.

Patented Jan. 6, 1914.
2 SHEETS—SHEET 1.

Witnesses
J. G. Huffel
J. J. McCarthy

Inventor
Vincent Link
By
Foster, Freeman, Watson & Coit
Attorneys

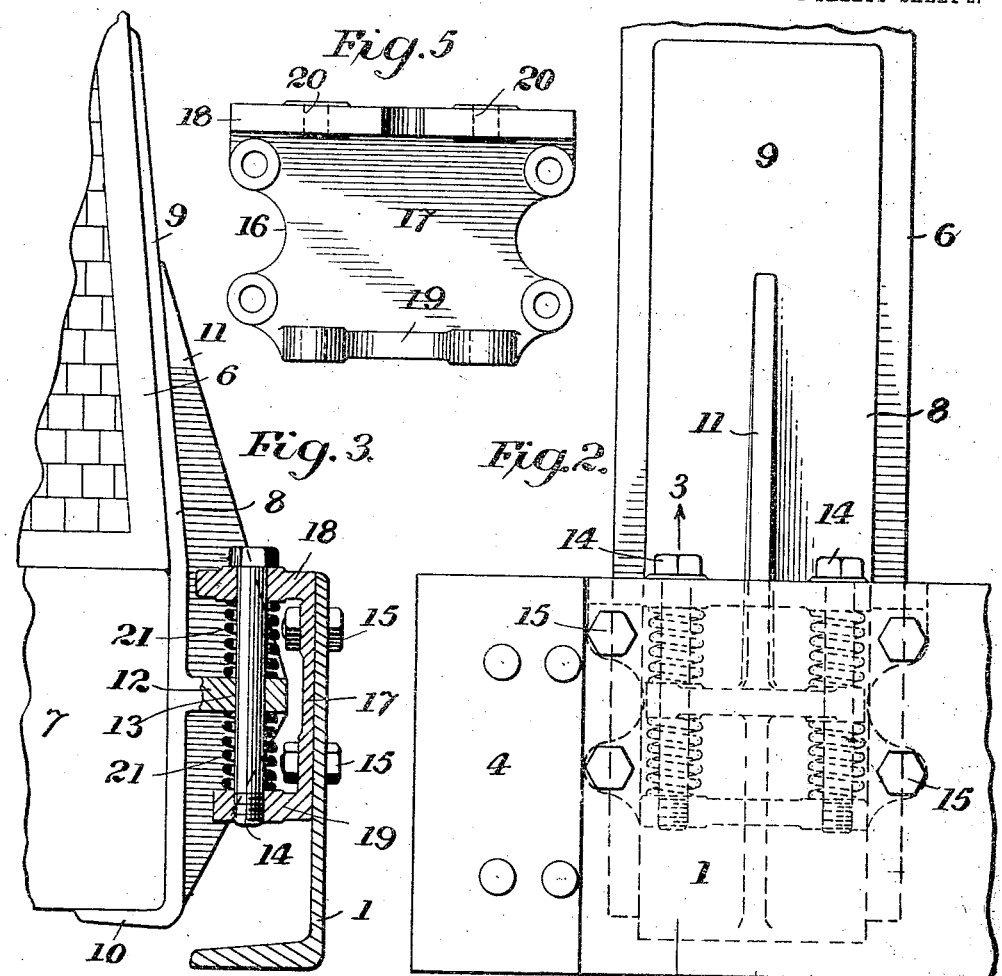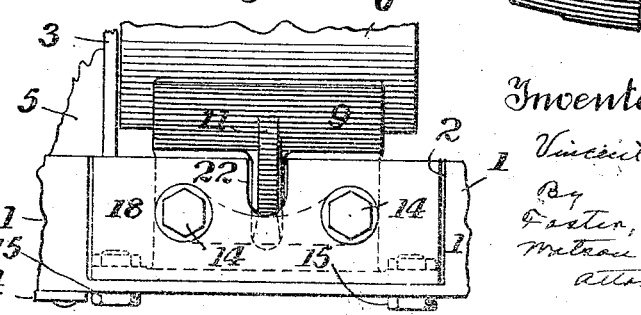

UNITED STATES PATENT OFFICE.

VINCENT LINK, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

MOTOR-VEHICLE.

1,083,330.  Specification of Letters Patent.  Patented Jan. 6, 1914.

Application filed December 7, 1908.   Serial No. 466,398.

*To all whom it may concern:*

Be it known that I, VINCENT LINK, a citizen of the United States, and resident of Detroit, in the county of Wayne and State of Michigan, have invented certain new and useful Improvements in Motor-Vehicles, of which the following is a specification.

This invention relates to motor vehicles and particularly to means for supporting the radiator from the vehicle frame. Its objects are to provide simple and efficient means for flexibly supporting the radiator so as to relieve it from shocks and jars to which the frame may be subjected, and to make such supporting means in such form as to have an attractive appearance and of such construction that the radiator may be easily and quickly adjusted and secured to the supporting means, or removed therefrom.

A further object is to make the supporting means of such simple construction that it can be easily and cheaply made and applied to motor vehicles.

The novel features of the invention will be apparent from the following description, taken in connection with the accompanying drawings.

In the drawings: Figure 1 is a perspective view of a radiator, and the parts of a motor vehicle from which it is supported; Fig. 2 is a side elevation of the forward part of a motor truck with the radiator suspended in accordance with this invention; Fig. 3 is a view partly in section on the line 3—3 of Fig. 2; Fig. 4 is a plan view of a portion of the end of the radiator and its support; Fig. 5 is an elevation of the supporting bracket looking in a direction opposite to that of Fig. 2.

In these drawings, 1 designates the side bars of the frame of the motor vehicle, which are made in the form of channel bars. Each of these channel bars has a portion of its upper flange cut away, as shown at 2 in Fig. 4, for a purpose hereafter described. The front cross bar 3 in the form of an L-section, is secured to the side bars of the frame. Secured to the front part of the frame by the steel strap 4 is a bumper 5 as shown partly broken away in Fig. 4. The radiator and casing 6 have a tank 7 immediately below them, and a bracket 8 is secured to the sides of the radiator and tank and supports them. This bracket has a plate portion 9 which extends along the sides of the radiator and tank, having its lower end 10 bent under the end of the tank 7, as clearly shown in Fig. 3, for the purpose of firmly supporting the tank and radiator. This bracket also has a vertically extending rib 11 which tapers toward its ends and has a horizontal ledge or flange 12 extending longitudinally of the radiator. This flange has vertical longitudinally separated openings 13 through which bolts 14 pass for the purpose hereafter indicated. A supporting bracket 16 is detachably secured to the web of the side bars 1 by bolts 15, and this bracket has a web portion 17 fitting against the web portion of the side bars. It also has top and bottom horizontal flanges 18 and 19, the upper flange 18 being of such size as to fill the cut-away portion 2 of the upper flange of the side bars, as will be seen clearly in Fig. 4. These flanges 18 and 19 are each provided with two longitudinally separated openings 20, the openings in one flange being in line with those in the other, and the openings in the flange 19 being provided with screw threads to receive the threaded end of the bolts 14. The bolts 14 pass through the openings 20 in the two flanges just described, and also pass through openings 13 in the flange 12. Between the flange 12 and the flanges 18 and 19, and surrounding the bolts 14, are coiled springs 21 of sufficient strength to yieldingly support the radiator, as will be clearly seen by reference to Fig. 3. It will be understood that other yielding supporting means may be used in place of these springs. The upper flange 18 has a notch 22 to receive the rib 11 on the bracket 8.

It will be observed that the applicant's supporting means will yieldingly support the radiator, whereby twisting strains due to movements of the frame will not be transmitted directly to the radiator, but will be taken up by the yielding connection, and therefore the radiator will be relieved from shocks and jars which would tend to break the soldered joints with which its parts are connected. It will be further observed that the supporting means is of very simple construction, which can be easily and cheaply made and applied, and that when placed in position, most of its parts are concealed by the side channel bars and consequently do not detract in any way from the appearance of the machine. By supporting the radiator at two longitudinally separated points on each side it will be understood that the radiator will be kept in vertical position by these yielding supports alone, although it is preferable to also provide a stay rod 25 extending from the top of the radiator to the dash of the vehicle to steady it when subjected to undue shocks.

Having thus described the invention, what is claimed is:

1. In a motor vehicle, the combination with the frame having side channel bars, of a radiator, a bracket secured to the inner side of said channel bar, a portion of the flange of the channel bar being cut away to receive the bracket, an inwardly projecting flange at the top of said bracket, an inwardly projecting flange below the top of said bracket, and connections between said flanges on the bracket for supporting the radiator.

2. In a motor vehicle, the combination with the frame having side bars, of a radiator, brackets secured to the sides of the radiator having longitudinal flanges provided with separated perforations, brackets secured to the side bars provided with two spaced longitudinal flanges each having two holes therethrough in line, bolts passing through said perforations and holes, and springs surrounding said bolts between said flanges for flexibly supporting the radiator at four points.

3. In a motor vehicle, the combination with the frame having side bars, of a radiator, a bracket secured to the side of the radiator, a bracket secured to the side bar, one of said brackets being provided with spaced flanges, and the other bracket being provided with a flange located between said spaced flanges, and springs between said flange and each of said spaced flanges for flexibly connecting said brackets and for supporting the radiator.

In testimony whereof I affix my signature in presence of two witnesses.

VINCENT LINK.

Witnesses:
DON T. HASTINGS,
HOWARD HARKNESS.